United States Patent Office 2,954,193
Patented Sept. 27, 1960

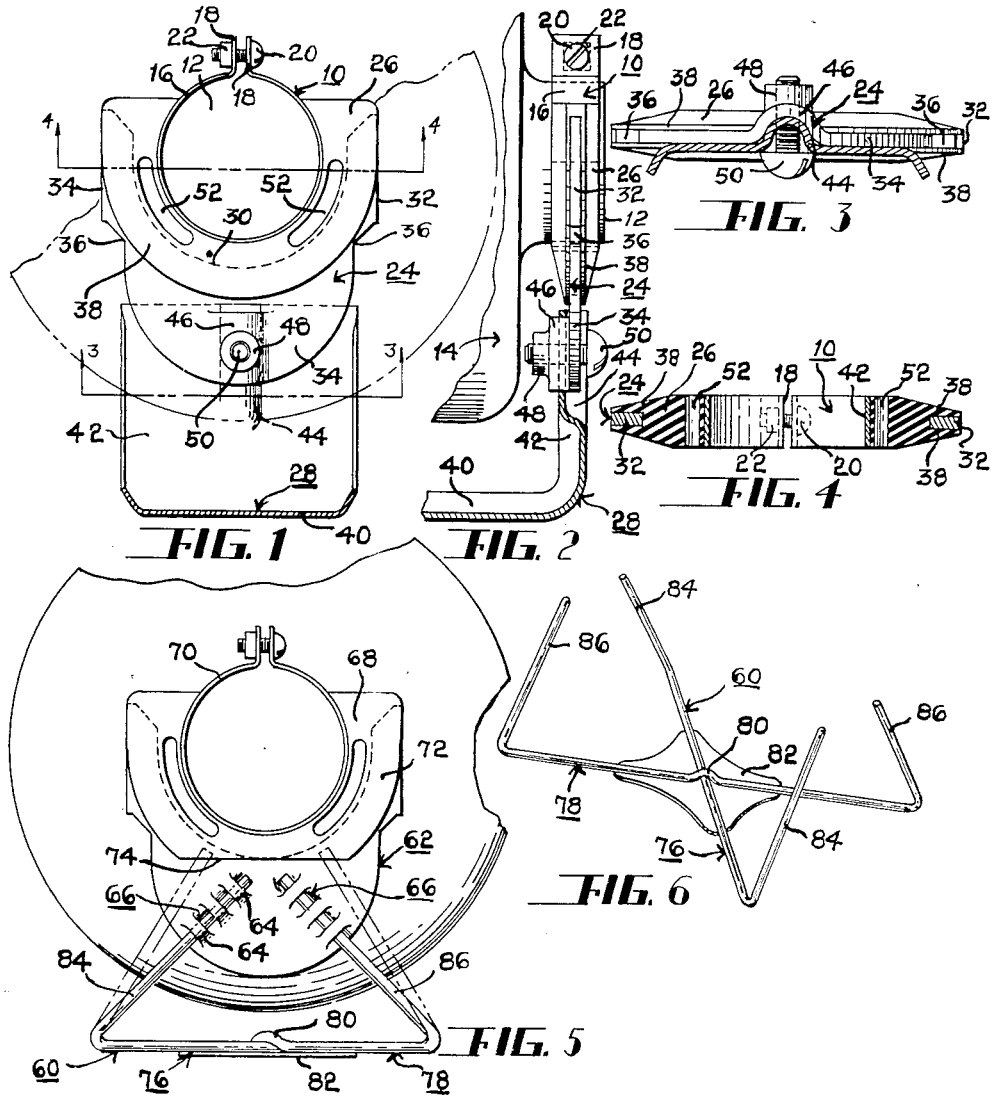

2,954,193

MOTOR MOUNTING

Homer J. Loftis, Ironton, Ohio, assignor to Henrite Products Corporation, a corporation of Ohio Filed Nov. 29, 1956, Ser. No. 625,157

2 Claims. (Cl. 248—26)

This invention relates to a motor mounting and more particularly to a resilient motor mounting wherein the motor itself is separated from the base or cradle which supports the motor by elastomeric material, although not necessarily so limited.

The motor mounting which is the subject of this invention is of the type disclosed in my copending application for a Resilient Mounting, Serial No. 567,522, filed February 24, 1956, now Patent No. 2,866,613, and for a Motor Mounting, Serial No. 625,158, filed November 29, 1956, now Patent No. 2,908,457.

An object of this invention is to provide an improved resilient motor mounting wherein the conventional resilient mounting ring normally engageable with the hub of the motor and detachable from the supporting cradle is replaced by a resilient clamping means for engaging the hub of the motor, which clamping means is permanently secured to a detachable portion of the supporting cradle.

Another object of this invention is to provide a resilient mounting for a motor which may be fabricated from die formed metal parts, thereby eliminating the need for costly machining such as is normally required in the fabrication of conventional resilient mounting rings.

Another object of this invention is to provide a resilient motor mounting wherein a reduced number of parts is employed and wherein assembly is easily and economically accomplished.

Other objects and advantages reside in the construction of parts, the combination thereof, the method of manufacture and the mode of operation, as will become more apparent from the following description.

In the drawing,

Figure 1 is a front elevational view of a preferred embodiment, with parts shown in section, the view being taken from the direction of the mounted motor.

Figure 2 is a side elevational view of the preferred embodiment, with parts shown in section.

Figure 3 is an enlarged sectional view, taken substantially along the line 3—3 of Figure 1.

Figure 4 is an enlarged sectional view, taken substantially along the line 4—4 of Figure 1.

Figure 5 is a fragmentary front elevational view of a modification.

Figure 6 is a perspective view of a base for the resilient mounting of Figure 5, drawn to a reduced scale.

Referring to the drawing in detail, a preferred embodiment of the resilient mounting assembly is illustrated in Figures 1 through 4. In this embodiment, a split ring clamp 10 is employed for engaging the hub 12 of a motor 14. The clamp 10 includes a metallic band 16 bent substantially into a circle and terminating at each end with an apertured lug 18 deflected outwardly from the ring. The lugs 18 are disposed in close proximity to one another in spaced parallel relation. A threaded screw 20 passes through the apertures in the lugs 18 and engages a nut 22 utilized in tightening the clamp 10 upon the hub 12. It is considered within the purview of this invention that one skilled in the art may substitute other clamps for the clamp 10 described herein.

The clamp 10 is retained in spaced relation to a supporting member 24 by an elastomeric element or ring segment 26. The supporting member 24 is a metal stamping having one end adapted to receive and cradle the elastomeric element 26 and having the other end adapted for engagement with a base portion 28. The end adapted to receive the elastomeric element 26 is provided with an arcuate margin 30 extending through slightly more than 180° of arc between spaced projecting arms 32 disposed on either side of the supporting member. The opposite end of the supporting member terminates in an arcuate projection 34 disposed between notched portions 36 on either side of the supporting member. The arrangement is such that one end of the supporting member complements the other, it being thereby possible to stamp a plurality of duplicate supporting members 24 from a length of metal band of the proper width with no waste of material.

In assembling the mounting, the clamp 10 and the arcuate marginal portion 30 of the supporting member 24 are positioned in concentric relation, the diameter of the clamp being less than the diameter of the arcuate margin 30. The elastomeric ring segment 26 is molded between the arcuate margin 30 which provides an outer ring segment, and the clamp 10 which provides an inner ring. The elastomeric element 26 is bonded to both the clamp 10 and the supporting member 24 and is provided with flanges 38 overlapping the arcuate margin 30 which serve to strengthen the bond between the elastomeric element 26 and the supporting member 24. As illustrated in Figure 1, the elastomeric element extends through more than 180° of arc, along the circumference of the clamp 10 and projects slightly beyond the arms 32 of the supporting member 24. The elastomeric ring segment 26 thus surrounds more than half the circumference of the clamp 10, so that vibratory motion of the clamp 10 in any direction in the plane of the ring segment 26 will produce compression in at least a portion of the ring segment 26.

The elastomeric ring segment 26 permits damped vibration of the motor and provides a yielding medium for absorbing any impact created by rapid changes in the output torque of the motor. As illustrated in Figure 1, arcuate slots 52 may be provided in the body of the elastomeric element 26, to increase the torsion yield of the elastomeric element.

The supporting member 24 is attachable in interlocking relation to the base portion 28. The base portion 28 comprises a yoke 40 terminating at each end in upwardly projecting flanges 42. Each flange 42 is provided with a vertical arcuate indentation 44 adapted to interlock with a complementary arcuate portion 46 struck from the projection 34 of the supporting member 24. An internally threaded boss 48, welded or otherwise secured to the portion 46 of the supporting member 24, engages a screw 50 passing through an aperture in the indented portion 44 of the flange 42 for securing the base and supporting member together. With this construction, the mating indented portions 44 and 46 insure that the supporting member 24 is non-rotatably secured to the yoke 40. In mounting a motor, such as the motor 14, the clamps 10 are first secured to the hubs 12 of the motor, then the supporting members 24 are attached to the yoke 40.

In a modification, a novel base 60, illustrated in Figure 6, is employed in combination with modified supporting members 62 analogous to the members 24 of the preferred embodiment. Each supporting member 62 is identical to the aforementioned supporting member 24, with the exception that the struck-out portion 46 and the boss 48 of the member 24 are absent, the member 62 being provided, instead, with angularly disposed groups of oppositely arched struck-out portions 64, providing angularly disposed receptacles 66 adapted to receive rod portions, as will be described hereinafter. Each supporting member 62 receives an elastomeric ring segment 68 and a split ring clamp 70, the construction being substantially identical to that described in connection with the supporting member 24. It is to be noted that the flange 72 of the elastomeric element 68 are cut away at 74, to provide clearance for the receptacles 66. The resiliency characteristics of the supporting elements 62 and 24 are substantially identical.

The supporting element 62 is adapted to engage the base 60, comprising an X-frame fabricated from intersecting spring steel rods 76 and 78, the latter being arched at 80 to receive the former at the point of intersection. The X-frame is strengthened by welding, or otherwise securing, a plate 82 to the rods 76 and 78 at the point of intersection. The ends of the rods 76 and 78 are bent upwardly from the plane of the X-frame, to provide legs 84 and 86, respectively, for engaging the receptacles 66 of the supporting members 62. The relaxed position of the legs 84 and 86 is illustrated in broken line detail in Figure 5, the legs being out of registry with the receptacles 66. When the legs 84 and 86 are inserted in the receptacles 66, the spring tension in the rods 76 and 78 will tend to bind the legs 84 and 86 in the receptacles 66, thereby removing any play of the legs in the receptacles.

The supporting members 62 are attached to the base 60 by first bending the rods 76 and 78 oppositely in the plane of the X-frame, so as to increase the acute angle therebetween, while simultaneously bending the legs 84 and 86 to the proper angular orientation for entry into the receptacles 66. By slowly relaxing the bending forces on the rods 76 and 78, while maintaining the legs 84 and 86 at the proper orientation, the legs may be guided into the receptacles 66.

Depending upon the resiliency of the spring metal rods 76 and 78, forming the base 60, and upon the desired ruggedness of the motor support, it may be advisable to spot weld the legs 84 and 86 in place in the receptacles 66.

Although the preferred embodiment and a modification of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A motor mounting comprising, in combination, a pair of resilient clamping means, there being one clamping means engageable with the hub at each end of an electric motor or the like, and a base for supporting said clamping means in spaced relation, said clamping means each including an inner split ring clamp, an elastomeric ring segment bonded to the external surface of said clamp, and a supporting member having an arcuate marginal portion providing an outer ring segment, said outer ring segment being bonded to the external surface of said elastomeric ring segment in concentric relation to said clamp, said supporting member having struck-out portions therein providing angularly disposed receptacles for engagement with said base, said base comprising a pair of spring metal rods arranged in intersecting relation to form an X-frame, means for securing said rods in fixed angular relation, said rods having their opposite end portions bent upwardly from the plane of the X-frame to provide legs engageable with the receptacles of said supporting members, there being one supporting member engaging one leg of each said rod, the supporting members being disposed one at each end of said X-frame, said rods being strained into engagement with the receptacles of said supporting members thereby creating a spring tension tending to bind the leg portions in the receptacles.

2. A motor mounting comprising, in combination, a pair of clamping members, there being one clamping member engageable with the hub at each end of an electric motor or the like, and a base for supporting said clamping member in spaced relation, said clamping members each having struck out portions therein providing angularly disposed receptacles for engagement with said base, said base comprising a pair of spring metal rods arranged in intersecting relation to form an X-frame, means for securing said rods in fixed angular relation, said rods having their opposite end portions bent upwardly from the plane of the X-frame to provide legs engageable with the receptacles of clamping members, there being one clamping member engaging one leg of each said rod, the clamping members being disposed one at each end of said X-frame, said rods being strained into engagement with the receptacles of said supporting members thereby creating a spring tension tending to bind the leg portions in the receptacles.

References Cited in the file of this patent

UNITED STATES PATENTS

| | | |
|---|---|---|
| 2,044,385 | Geyer | June 16, 1936 |
| 2,291,148 | Carson | July 28, 1942 |
| 2,543,997 | Vavra | Mar. 6, 1951 |
| 2,591,669 | Bucknell | Apr. 5, 1952 |